United States Patent
Honda et al.

(10) Patent No.: US 10,981,366 B2
(45) Date of Patent: *Apr. 20, 2021

(54) OPTICAL POLYESTER FILM AND TRANSPARENT CONDUCTIVE FILM

(71) Applicant: MITSUBISHI GAS CHEMICAL COMPANY, INC., Tokyo (JP)

(72) Inventors: Eiichi Honda, Kanagawa (JP); Yasuaki Yoshimura, Kanagawa (JP); Keita Noguchi, Kanagawa (JP); Yuichiro Satake, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 89 days.

This patent is subject to a terminal disclaimer.

(21) Appl. No.: 16/337,046

(22) PCT Filed: Sep. 27, 2017

(86) PCT No.: PCT/JP2017/035075
§ 371 (c)(1),
(2) Date: Mar. 27, 2019

(87) PCT Pub. No.: WO2018/062328
PCT Pub. Date: Apr. 5, 2018

(65) Prior Publication Data
US 2020/0031108 A1 Jan. 30, 2020

(30) Foreign Application Priority Data
Sep. 28, 2016 (JP) .............. JP2016-190229

(51) Int. Cl.
| | | |
|---|---|---|
| *B32B 27/36* | (2006.01) | |
| *G02B 1/14* | (2015.01) | |
| *B32B 27/06* | (2006.01) | |
| *C08G 63/06* | (2006.01) | |
| *C08G 63/199* | (2006.01) | |
| *G02B 1/04* | (2006.01) | |
| *G02B 1/11* | (2015.01) | |

(52) U.S. Cl.
CPC .............. *B32B 27/36* (2013.01); *B32B 27/06* (2013.01); *C08G 63/06* (2013.01); *C08G 63/199* (2013.01); *G02B 1/04* (2013.01); *G02B 1/11* (2013.01); *G02B 1/14* (2015.01); *B32B 2250/02* (2013.01); *B32B 2250/24* (2013.01); *B32B 2307/302* (2013.01); *B32B 2307/412* (2013.01); *B32B 2307/724* (2013.01); *B32B 2405/00* (2013.01)

(58) Field of Classification Search
CPC ............ B32B 2250/02; B32B 2250/24; B32B 2307/302; B32B 2307/412; B32B 2307/724; B32B 2405/00; B32B 27/06; B32B 27/36; C08G 63/06; C08G 63/199; C08J 5/18; G02B 1/04; G02B 1/11; G02B 1/113; G02B 1/14
See application file for complete search history.

(56) References Cited

U.S. PATENT DOCUMENTS

| | | | |
|---|---|---|---|
| 4,649,214 A | 3/1987 | Gladfelter et al. | |
| 2012/0301676 A1* | 11/2012 | Ushida ................ | G02B 1/14 |
| | | | 428/148 |
| 2013/0280554 A1* | 10/2013 | Yamazaki .............. | H01B 5/14 |
| | | | 428/697 |

FOREIGN PATENT DOCUMENTS

| | | | |
|---|---|---|---|
| CN | 104946145 A | | 9/2015 |
| JP | 1990-092936 | | 4/1990 |
| JP | 2-253201 | | 10/1990 |
| JP | 6-43301 | | 2/1994 |
| JP | 2007161917 | * | 6/2007 |
| JP | 2007161917 A | | 6/2007 |
| JP | 2007-197651 | | 8/2007 |
| JP | 2007-213043 | | 8/2007 |
| JP | 2007-224281 | | 9/2007 |
| JP | 2011-52190 | | 3/2011 |
| JP | WO2012035874 | * | 3/2012 |
| TW | 201213387 A | | 4/2012 |
| WO | 2012/035874 | | 3/2012 |

OTHER PUBLICATIONS

Denis E. Ryono et al., "Electrostatic Facilitation of General Acid Catalyzed a-Oxonium Ion Formation in a Lysozyme-Like Environment: Synthesis of the Models", Journal of the American Chemical Society, 98(7), May 21, 1975, pp. 1889-1899.

(Continued)

*Primary Examiner* — Ling Siu Choi
*Assistant Examiner* — Gennadiy Mesh
(74) *Attorney, Agent, or Firm* — Greenblum and Bernstein P.L.C.

(57) ABSTRACT

An object is to provide an optical polyester film and a transparent conductive film that are superior in transparency, heat resistance, optical properties, and adhesion. The optical polyester film includes: a base material containing a polyester resin containing a unit (A) of the following formula (1); and at least one functional layer disposed on at least one surface of the base material, wherein the at least one functional layer is selected from the group consisting of a hard coat layer, a transparent conductive layer, an antireflection layer, a gas barrier layer, and an adhesive layer.

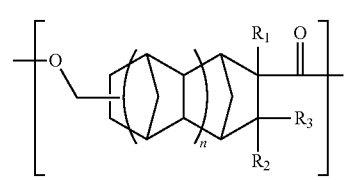

(1)

4 Claims, 2 Drawing Sheets

(56) References Cited

OTHER PUBLICATIONS

Official Communication issued in International Application No. PCT/JP2017/035075, dated Jan. 9, 2018.

* cited by examiner

OPTICAL POLYESTER FILM AND TRANSPARENT CONDUCTIVE FILM

TECHNICAL FIELD

The present invention relates to an optical polyester film and a transparent conductive film.

BACKGROUND ART

General-purpose PET is superior in various properties such as mechanical properties, dimensional stability, transparency, and heat resistance and is widely used as a base film in many applications such as in packaging materials. In particular, in recent years, there is an increasing demand for various optical films such as films for flat panel displays and transparent conductive films.

Biaxially-oriented polyester films conventionally proposed have a problem in that, when used to assemble liquid crystal displays or touch panels, the films produce interference color due to stretching-induced polymer birefringence, causing quality degradation of displayed images.

To address such a problem, reduction in photoelastic coefficient of a polyester material has been investigated (see Patent Literature 1, for example).

CITATION LIST

Patent Literature

Patent Literature 1: Japanese Patent Laid-Open No. 2011-52190

SUMMARY OF INVENTION

Technical Problem

However, the technology described in Patent Literature 1 fails to sufficiently prevent interference color in an assembled liquid crystal display, leaving room for improvement. It may be envisaged to use a base film based on a cycloolefin polymer; however, such a film has the problems of low surface activity and poor adhesion to various coatings, although the use of the film can provide good optical properties. As seen from the foregoing, optical films superior in optical properties and other various properties including adhesion have not been obtained yet.

The present invention has been made to overcome the above disadvantages of the prior art, and it is an object of the prevent invention to provide an optical polyester film and a transparent conductive film that are superior in transparency, heat resistance, optical properties, and adhesion.

Solution to Problem

As a result of intensive investigations aimed at solving the above problems, the present inventors have found that the use of a polyester resin containing a particular alicyclic structure as a structural unit gives rise to not only high heat resistance and good optical characteristics but also enhanced adhesion to various coatings, and have completed the present invention.

That is, the present invention is as follows.

[1]

An optical polyester film comprising:
a base material comprising a polyester resin comprising a unit (A) of the following formula (1); and
at least one functional layer disposed on at least one surface of the base material, wherein the at least one functional layer is selected from the group consisting of a hard coat layer, a transparent conductive layer, an anti-reflection layer, a gas barrier layer, and an adhesive layer.

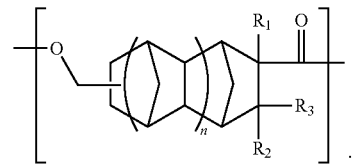

(1)

In the formula (1), $R_1$ is a hydrogen atom, $CH_3$, or $C_2H_5$, $R_2$ and $R_3$ are each independently a hydrogen atom or $CH_3$, and n is 0 or 1.

[2]

The optical polyester film according to [1], wherein, in the formula (1), n is 1.

[3]

The optical polyester film according to [1] or [2], wherein, in the formula (1), $R_1$, $R_2$, and $R_3$ are hydrogen atoms.

[4]

The optical polyester film according to any one of [1] to [3], wherein the polyester resin satisfies the following conditions (1) to (3):

(1) a glass transition temperature of the polyester resin is 100° C. or higher;
(2) an amount of heat generated by the polyester resin at cooling crystallization is 5 J/g or less; and
(3) an absolute value of photoelastic coefficient of the polyester resin is $40 \times 10^{-12}$ $Pa^{-1}$ or less.

[5]

A transparent conductive film comprising the optical polyester film according to any one of [1] to [4], wherein the functional layer comprises a transparent conductive layer.

Advantageous Effects of Invention

The present invention can provide an optical polyester film and a transparent conductive film that are superior in transparency, heat resistance, optical properties, and adhesion.

DESCRIPTION OF EMBODIMENTS

Figure 1:
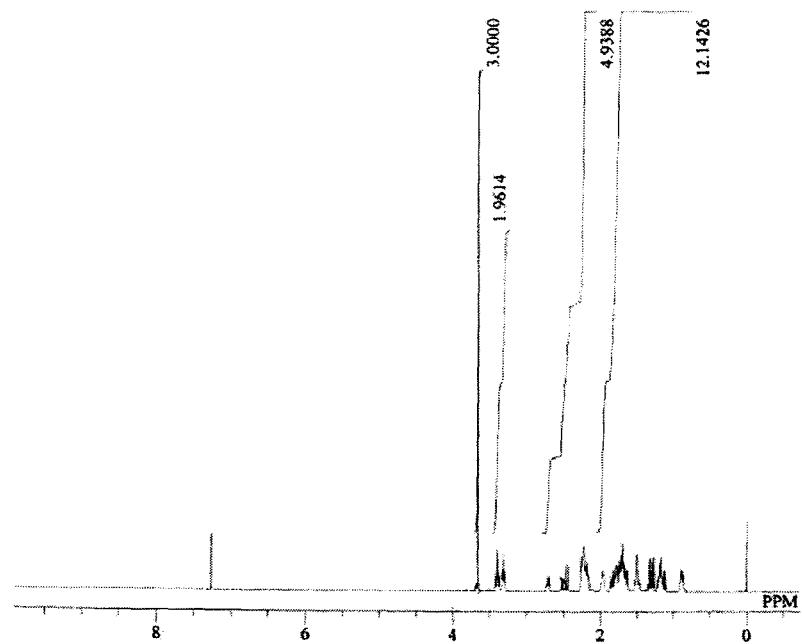
FIG. 1 shows a result of $^1$H-NMR measurement of a main reaction product obtained in a monomer synthesis example.

An embodiment of the present invention (which will be simply referred to as "present embodiment" hereinafter) will now be described in detail. The present embodiment described below is only illustrative of the present invention and is not intended to limit the present invention to the contents of the following description. The present invention can be carried out with appropriate modifications falling within the gist of the invention.

<Optical Polyester Film>

An optical polyester film of the present embodiment comprises: a base material containing a polyester resin containing a unit (A) of the following formula (1); and at least one functional layer disposed on at least one surface of the base material, wherein the at least one functional layer is selected from the group consisting of a hard coat layer, a transparent conductive layer, an anti-reflection layer, a gas barrier layer, and an adhesive layer.

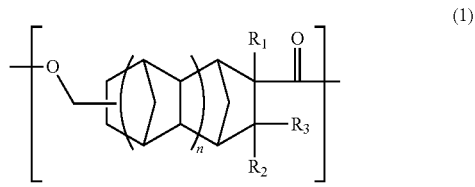

(1)

In the formula (1), $R_1$ is a hydrogen atom, $CH_3$, or $C_2H_5$, $R_2$ and $R_3$ are each independently a hydrogen atom or $CH_3$, and n is 0 or 1.

Being configured as described above, the optical polyester film of the present embodiment is superior in transparency, heat resistance, optical properties, and adhesion.

In the present embodiment, "superior in heat resistance" means that the glass transition temperature (Tg) as measured by the method described in Examples below is sufficiently high, and "superior in optical characteristics" means that the absolute value of the photoelastic coefficient as measured by the method described in Examples below is sufficiently low.

In the present embodiment, the term "film" is used to encompass both a "film" and a "sheet" which technically can be distinguished from each other according to the thickness.

[Base Material]

The base material in the present embodiment is constructed from the polyester resin defined above. The polyester resin in the present embodiment contains a unit (A) of the formula (1) (this unit may be referred to as "unit (A)" hereinafter), and can be a homopolymer consisting solely of the unit (A) or can, if necessary, be a copolymer further containing a diol unit (B) (this unit may be referred to as "unit (B)" hereinafter) and a unit (C) derived from a dicarboxylic acid or an ester-forming derivative thereof (this unit may be referred to as "unit (C)" hereinafter).

In the formula (1), $R_1$ is preferably a hydrogen atom or $CH_3$, and $R_2$ and $R_3$ are preferably hydrogen atoms. In the present embodiment, $R_1$, $R_2$, and $R_3$ in the formula (1) are more preferably hydrogen atoms from the viewpoint of heat resistance.

In the formula (1), n is preferably 1 in order to further improve the heat resistance.

In the present embodiment, the content of the structural unit (A) based on the total structural units of the polyester resin is preferably 10 to 95 mol % from the viewpoint of the balance of transparency, heat resistance, and optical characteristics. When the content is 10 mol % or more, sufficiently good heat resistance and optical characteristics tend to be achieved. The reason why the content is preferably 95 mol % or less is that in this case the formability of the film can be improved while good heat resistance and optical characteristics are obtained. From the same viewpoint, the content of the unit (A) is more preferably 15 to 95 mol % and even more preferably 20 to 95 mol %.

The structural unit (B) is not particularly limited and may be any unit derived from a diol. Specific examples of the unit (B) include units derived from the following diols: ethylene glycol, trimethylene glycol, 1,4-butanediol, 1,5-pentanediol, 1,6-hexanediol, diethylene glycol, propylene glycol, neopentyl glycol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, pentacyclopentadecanedimethanol, norbornanediol, cyclohexanediol, 2,2'-bis(4-hydroxycyclohexyl)propane, adamantanediol, 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-phenylphenyl]fluorene, 9,9-bis(2-hydroxyethyl)fluorene, xylylene glycol, 3,9-bis(1,1-dimethyl-2-hydroxyethyl)-2,4,8,10-tetraoxaspiro[5.5]undecane, 1,4:3,6-dianhydro-D-sorbitol, and 2,2,4,4-tetramethyl-1,3-cyclobutanediol.

The structural unit (B) is preferably a unit derived from an aliphatic diol or a diol having a cardo structure in order to obtain good optical characteristics. The unit derived from an aliphatic diol is more preferably a unit derived from 1,4-cyclohexanedimethanol, ethylene glycol, 3,9-bis(1,1-dimethyl-2-hydroxyethyl)-2,4,8,10-tetraoxaspiro[5.5]undecane, or 1,4:3,6-dianhydro-D-sorbitol. The unit derived from a diol having a cardo structure is more preferably a unit derived from 9,9-bis[4-(2-hydroxyethoxy)phenyl]fluorene, 9,9-bis[4-(2-hydroxyethoxy)-3-methylphenyl]fluorene, or 9,9-bis[4-(2-hydroxyethoxy)-3-phenylphenyl]fluorene.

The optical isomerism of these diols is not particularly limited, and they may be a cis isomer, a trans isomer, or a mixture thereof.

One of the above units may be contained alone, or two or more of the above units may be contained in combination.

The structural unit (C) is not particularly limited and may be any unit derived from a dicarboxylic acid or an ester-forming derivative of the dicarboxylic acid. Specific examples of the unit (C) include: structural units derived from aromatic dicarboxylic acids such as terephthalic acid, isophthalic acid, phthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 2-methylterephthalic acid, biphenyldicarboxylic acid, and tetralindicarboxylic acid and/or derivatives of these aromatic dicarboxylic acids; units derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, 1,4:5,8-dimethanodecahydronaphthalenedicarboxylic acid, adamantanedicarboxylic acid, and dimer acids and/or derivatives of these aliphatic dicarboxylic acids; and units derived from dicarboxylic acids having a cardo structure such as 9,9-bis(carboxymethyl)fluorene, 9,9-bis(1-carboxyethyl)fluorene, 9,9-bis(2-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-methylpropyl)fluorene, 9,9-bis(2-carboxybutyl)fluorene, 9,9-bis(2-carboxy-1-methylbutyl)fluorene, and 9,9-bis(5-carboxypentyl)fluorene and/or derivatives of these dicarboxylic acids having a cardo structure.

In order to obtain good optical characteristics, the structural unit (C) is preferably a unit derived from an aliphatic dicarboxylic acid or an ester-forming derivative thereof or a unit derived from a dicarboxylic acid having a cardo structure or an ester-forming derivative thereof. The unit derived from an aliphatic dicarboxylic acid or an ester-forming derivative thereof is more preferably a unit derived from dimethyl 1,4-cyclohexanedicarboxylate from the viewpoint of the property balance of transparency, heat resistance, and optical characteristics. The unit derived from a dicarboxylic acid having a cardo structure or an ester-forming derivative thereof is more preferably a unit derived from 9,9-bis(methoxycarbonylmethyl)fluorene, 9,9-bis(methoxycarbonylethyl)fluorene, or 9,9-bis(methoxycarbonylpropyl)fluorene from the viewpoint of the property balance of transparency, heat resistance, and optical characteristics.

The optical isomerism of these dicarboxylic acids and derivatives thereof is not particularly limited, and they may be a cis isomer, a trans isomer, or a mixture thereof.

One of the above units may be contained alone, or two or more of the above units may be contained in combination.

In the present embodiment, the polyester resin may contain a hydroxyl group and a unit other than the units (A) to (C), and the other unit is, for example, a unit (A1) derived from a carboxylic acid or an ester-forming derivative thereof. The unit (A1) is not particularly limited, and examples thereof include units derived from oxyacids such as glycolic acid, lactic acid, hydroxybutyric acid, 2-hydroxyisobutyric acid, hydroxybenzoic acid, 6-hydroxycaproic acid, and 4-hydroxycyclohexanecarboxylic acid and/or derivatives of these oxyacids.

In the present embodiment, the glass transition temperature (Tg) of the polyester resin is not particularly limited as long as the effect of the present embodiment is obtained. In order to obtain sufficient heat resistance, the glass transition temperature (Tg) is preferably 90° C. or higher, more preferably 95° C. or higher, and even more preferably 100° C. or higher. The Tg can be measured by the method described in Examples below. The Tg can be adjusted within the above range, for example, by appropriately adjusting the proportions of starting monomers for the polyester resin in copolymerization.

In the present embodiment, the amount of heat generated by the polyester resin at cooling crystallization is not particularly limited as long as the effect of the present embodiment is obtained. In order to obtain sufficient transparency, the amount of heat generated at cooling crystallization is preferably 5 J/g or less, more preferably 1 J/g or less, and even more preferably 0.3 J/g or less. The amount of heat generated at cooling crystallization can be measured by the method described in Examples below. The amount of heat generated at cooling crystallization can be adjusted within the above range, for example, by appropriately adjusting the proportions of starting monomers for the polyester resin in copolymerization.

In the present embodiment, the absolute value of the photoelastic coefficient of the polyester resin is not particularly limited as long as the effect of the present embodiment is obtained. In order to obtain sufficient optical characteristics, the absolute value of the photoelastic coefficient is preferably $40 \times 10^{-12}$ $Pa^{-1}$ or less, more preferably $35 \times 10^{-12}$ $Pa^{-1}$ or less, and even more preferably $30 \times 10^{-12}$ $Pa^{-1}$ or less. The absolute value of the photoelastic coefficient can be measured by the method described in Examples below. The absolute value of the photoelastic coefficient can be adjusted within the above range, for example, by appropriately adjusting the proportions of starting monomers for the polyester resin in copolymerization.

When the polyester resin in the present embodiment is used, it is suitable to add a known additive such as an antioxidant, a release agent, an ultraviolet absorber, a flowability improver, a crystal nucleating agent, a toughener, a dye, an anti-static agent, or an anti-microbial agent.

(Method of Producing Polyester Resin)

The polyester resin in the present embodiment can be obtained by homopolymerization of a monomer corresponding to the unit (A) or by copolymerization of monomers corresponding to the units (A) to (C). The following will describe a method of producing a monomer corresponding to the unit (A). Such a monomer is represented, for example, by the following formula (2).

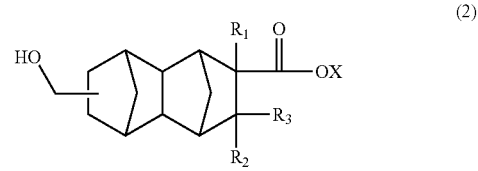

In the formula (2), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In the formula (2), $R_1$ is preferably a hydrogen atom or $CH_3$. $R_2$ and $R_3$ are preferably hydrogen atoms. Examples of the hydrocarbon group include, but are not limited to, methyl, ethyl, propyl, butyl, vinyl, 2-hydroxyethyl, and 4-hydroxybutyl groups.

The compound of the formula (2) in the present embodiment can be synthesized, for example, by a route of the following formula (I) using dicyclopentadiene or cyclopentadiene and a functional group-containing olefin as starting materials.

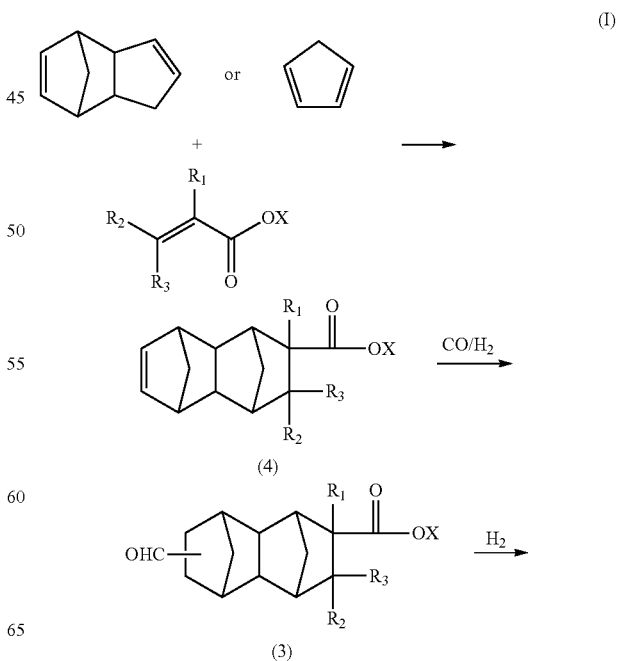

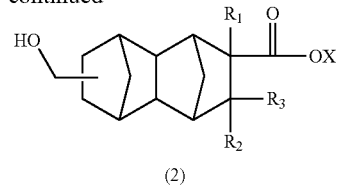

(2)

In the formula (I), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

[Production of $C_{13}$ to $C_{21}$ Monoolefin of Formula (4) in Formula (I)]

The $C_{13}$ to $C_{21}$ monoolefin of the formula (4) can be produced, for example, by a Diels-Alder reaction between a functional group-containing olefin and dicyclopentadiene.

Specific examples of the functional group-containing olefin used for the Diels-Alder reaction include, but are not limited to, methacrylic acid, methyl methacrylate, ethyl methacrylate, propyl methacrylate, butyl methacrylate, vinyl methacrylate, 2-hydroxyethyl methacrylate, 4-hydroxybutyl methacrylate, acrylic acid, methyl acrylate, ethyl acrylate, propyl acrylate, butyl acrylate, vinyl acrylate, 2-hydroxyethyl acrylate, 4-hydroxybutyl acrylate, crotonic acid, methyl crotonate, ethyl crotonate, 3-methylcrotonic acid, methyl 3-methylcrotonate, and ethyl 3-ethylcrotonate. Preferred olefins include methacrylic acid, methyl methacrylate, 2-hydroxyethyl methacrylate, acrylic acid, methyl acrylate, and 2-hydroxyethyl acrylate. More preferred olefins include methyl methacrylate and methyl acrylate.

Examples of the functional group-containing olefin used for the Diels-Alder reaction further include acrylonitrile, methacrylonitrile, acrolein, and methacrolein. With the use of such an olefin as a starting material, for example, a monoolefin of formula (4') can be produced by the route of the following formula (II) or (III).

(II)

+

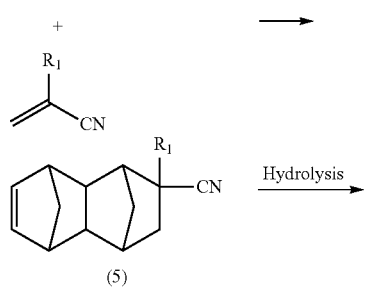

(4')

In the formula (II), $R_1$ is a hydrogen atom or $CH_3$.

(III)

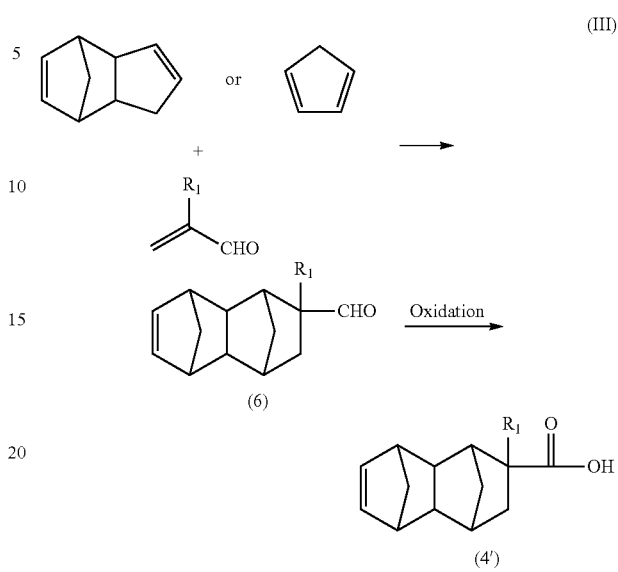

(4')

In the formula (III), $R_1$ is a hydrogen atom or $CH_3$.

The dicyclopentadiene used for the Diels-Alder reaction is preferably highly pure, and the contents of butadiene, isoprene, and other substances are preferably reduced. The purity of the dicyclopentadiene is preferably 90% or more and more preferably 95% or more. Dicyclopentadiene is prone to be depolymerized into cyclopentadiene (so-called monocyclopentadiene) under heating conditions, and it is thus possible to use cyclopentadiene instead of dicyclopentadiene. The $C_{13}$ to $C_{21}$ monoolefin of the formula (4) is thought to be produced substantially via a $C_8$ to $C_{16}$ monoolefin of the following formula (7) (product of first Diels-Alder reaction), and the produced monoolefin of the formula (7) is thought to act as a new diene-reactive compound (dienophile) which is involved in a Diels-Alder reaction (second Diels-Alder reaction) with cyclopentadiene (diene) present in the reaction system to produce the $C_{13}$ to $C_{21}$ monoolefin of the formula (4).

In view of these points, for example, the $C_{13}$ to $C_{21}$ monoolefin of the formula (4) or the $C_8$ to $C_{16}$ monoolefin of the formula (7) can be selectively obtained by appropriately controlling the reaction conditions of the first Diels-Alder reaction in the reaction route of the formula (I).

(7)

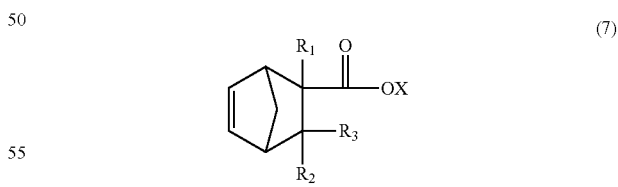

In the formula (7), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In order to allow the two-step Diels-Alder reaction to proceed efficiently, i.e., in order to selectively obtain the $C_{13}$ to $C_{21}$ monoolefin of the formula (4), the presence of cyclopentadiene in the reaction system is important. Therefore, the reaction temperature is preferably 100° C. or higher, more preferably 120° C. or higher, and even more preferably 130° C. or higher. In order to selectively obtain the $C_8$ to $C_{16}$ monoolefin of the formula (7), the reaction temperature is preferably lower than 180° C. In either case, the reaction is preferably carried out at a temperature of 250° C. or lower in order to inhibit formation of a high-boiling substance as a by-product.

The $C_{13}$ to $C_{21}$ monoolefin of the formula (4) obtained as described above can be subjected to a hydroformylation reaction and reduction reaction as described below to obtain a monomer corresponding to the unit of the formula (1) wherein n=1 (i.e., a compound of the formula (2)). The $C_8$ to $C_{16}$ monoolefin of the formula (7) obtained as described above can be subjected to a similar hydroformylation reaction and reduction reaction to obtain a monomer corresponding to the unit of the formula (1) wherein n=0 (i.e., a compound of the formula (8)).

A hydrocarbon, an alcohol, or an ester can also be used as the reaction solvent and, for example, aliphatic hydrocarbons having 6 or more carbon atoms, cyclohexane, toluene, xylene, ethylbenzene, mesitylene, propanol, and butanol are preferred. A known catalyst such as $AlCl_3$ may be added if necessary.

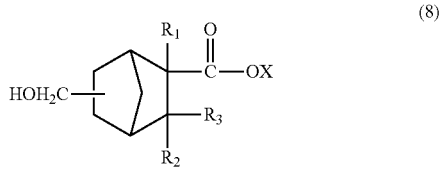

(8)

In the formula (8), $R_1$ is a hydrogen atom, $CH_3$, or $C_2H_5$, $R_2$ and $R_3$ are each independently a hydrogen atom or $CH_3$, and X is a hydrogen atom or a hydrocarbon group having four or less carbon atoms and optionally containing a hydroxyl group.

The Diels-Alder reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate is made to flow in a tubular reactor under predetermined reaction conditions.

The reaction product as obtained by the Diels-Alder reaction may directly be used as a starting material for the hydroformylation reaction or may be purified by a technique such as distillation, extraction, or crystallization prior to being subjected to the subsequent step.

[Production of $C_{14}$ to $C_{22}$ Difunctional Compound of Formula (3) in Formula (I)]

The $C_{14}$ to $C_{22}$ difunctional compound of the formula (3) in the formula (I) can be produced, for example, by subjecting the $C_{13}$ to $C_{21}$ monoolefin of the formula (4), carbon monoxide gas, and hydrogen gas to a hydroformylation reaction in the presence of a rhodium compound and an organophosphorus compound.

The rhodium compound used in the hydroformylation reaction may be any compound which forms a complex with an organophosphorus compound and which exhibits hydroformylation activity in the presence of carbon monoxide and hydrogen, and the form of the precursor of the rhodium compound is not particularly limited. For example, a catalyst precursor such as dicarbonylacetylacetonato rhodium (hereinafter referred to as "Rh(acac)($CO)_2$"), $Rh_2O_3$, $Rh_4(CO)_{12}$, $Rh_6(CO)_{16}$, or $Rh(NO_3)_3$ may be introduced, together with an organophosphorus compound, into a reaction mixture, and thus a rhodium carbonyl hydride-phosphorus complex having catalytic activity may be formed in a reaction vessel. Alternatively, a rhodium carbonyl hydride-phosphorus complex may be prepared beforehand, and the prepared complex may be introduced into a reactor. A specific example of preferred methods is a method in which Rh(acac) ($CO)_2$ is reacted with an organophosphorus compound in the presence of a solvent and then the reaction product is introduced together with excess of the organophosphorus compound into a reactor so as to give a rhodium-organophosphorus complex having catalytic activity.

Investigations by the present inventors have revealed that a two-step Diels-Alder reaction product as represented by the formula (4) which has an internal olefin with a relatively high molecular weight can be hydroformylated with an extremely small amount of rhodium catalyst. The amount of the rhodium compound used in the hydroformylation reaction is preferably 0.1 to 60 micromoles, more preferably 0.1 to 30 micromoles, even more preferably 0.2 to 20 micromoles, and particularly preferably 0.5 to 10 micromoles, based on 1 mole of the $C_{13}$ to $C_{21}$ monoolefin of the formula (4) which is a substrate in the hydroformylation reaction. When the amount of the rhodium compound used is less than 60 micromoles based on 1 mole of the $C_{13}$ to $C_{21}$ monoolefin, it can be considered that there is no practical need for any installation for collecting and recycling the rhodium complex. Thus, the present embodiment enables reduction in economic burden associated with collecting/recycling installations, thereby allowing reduction in cost associated with rhodium catalysts.

The organophosphorus compound which forms the hydroformylation reaction catalyst for the hydroformylation reaction in the present embodiment together with the rhodium compound is not particularly limited, and examples of the organophosphorus compound include a phosphine of the formula $P(-R_a)(-R_b)(-R_c)$ and a phosphite of the formula $P(-OR_a)(-OR_b)(-OR_c)$. Specific examples of $R_a$, $R_b$, and $R_c$ include, but are not limited to, an aryl group which may be substituted with a $C_1$ to $C_4$ alkyl or alkoxy group and an alicyclic alkyl group which may be substituted with a $C_1$ to $C_4$ alkyl or alkoxy group. Triphenylphosphine and triphenyl phosphite are suitably used. The amount of the organophosphorus compound used is preferably 300 to 10000 times, more preferably 500 to 10000 times, even more preferably 700 to 5000 times, particularly preferably 900 to 2000 times, the amount of rhodium atoms in the rhodium compound on a molar basis. When the amount of the organophosphorus compound used is 300 or more times the amount of rhodium atoms on a molar basis, sufficient stability of the rhodium carbonyl hydride-phosphorus complex serving as a catalytically active material tends to be obtained, with the result that good reactivity tends to be obtained. The reason why the amount of the organophosphorus compound used is preferably 10000 or less times the amount of rhodium atoms on a molar basis is that in this case the cost spent on the organophosphorus compound can be sufficiently reduced.

The hydroformylation reaction can be carried out without the use of any solvent. However, with the use of a solvent inert in the reaction, the reaction can be accomplished in a more preferred manner. The solvent used in the hydroformylation reaction is not particularly limited and can be any solvent capable of dissolving the $C_{13}$ to $C_{21}$ monoolefin of the formula (4), dicyclopentadiene or cyclopentadiene, the rhodium compound, and the organophosphorus compound. Specific examples of the solvent include, but are not limited to: hydrocarbons such as aliphatic hydrocarbons, alicyclic hydrocarbons, and aromatic hydrocarbons; esters such as aliphatic esters, alicyclic esters, and aromatic esters; alcohols such as aliphatic alcohols and alicyclic alcohols; and solvents such as aromatic halides. Among these, hydrocarbons are suitably used and, in particular, alicyclic hydrocarbons and aromatic hydrocarbons are more suitably used.

The temperature during the hydroformylation reaction is preferably 40° C. to 160° C. and more preferably 80° C. to 140° C. When the reaction temperature is 40° C. or higher, a sufficient reaction rate tends to be achieved, and the monoolefin as a starting material tends to be prevented from remaining unreacted. Setting the reaction temperature to 160° C. or lower tends to reduce formation of by-products derived from the starting monoolefin or the reaction product and effectively prevent decrease in reaction performance.

The hydroformylation reaction in the present embodiment is preferably carried out under pressurization with carbon monoxide (occasionally referred to as "CO" hereinafter) gas and hydrogen (occasionally referred to as "$H_2$" hereinafter) gas. In this case, the CO and $H_2$ gases can be each independently introduced into the reaction system or can be introduced into the reaction system together in the form of a mixed gas prepared beforehand. The molar ratio between the CO and $H_2$ gases (=CO/$H_2$) introduced into the reaction system is preferably 0.2 to 5, more preferably 0.5 to 2, and even more preferably 0.8 to 1.2. When the molar ratio between the CO and $H_2$ gasses is adjusted within the above range, the activity of the hydroformylation reaction or the selectivity to the intended aldehyde tends to be increased. The amount of the CO and $H_2$ gases introduced into the reaction system decreases as the reaction proceeds, and thus the use of a CO/$H_2$ mixed gas prepared beforehand may facilitate the reaction control.

The reaction pressure in the hydroformylation reaction is preferably 1 to 12 MPa, more preferably 1.2 to 9 MPa, and even more preferably 1.5 to 5 MPa. Setting the reaction pressure to 1 MPa or more tends to provide a sufficient reaction rate, and tends to sufficiently prevent the monoolefin as a starting material from remaining unreacted. Setting the reaction pressure to 12 MPa or less eliminates the need for any expensive installation having high pressure resistance and is therefore economically advantageous. In particular, when the reaction is carried out in a batch mode or semibatch mode which involves depressurization by discharge of the CO and $H_2$ gases after completion of the reaction, a lower reaction pressure causes a smaller loss of the CO and $H_2$ gases and is therefore more economically advantageous.

The suitable reaction mode of the hydroformylation reaction is a batch reaction or semibatch reaction. The semibatch reaction can be carried out by placing the rhodium compound, the organophosphorus compound, and the solvent in a reactor, creating the previously described reaction conditions through pressurization with a CO/$H_2$ gas and/or heating, and then supplying the monoolefin as a starting material or a solution of the monoolefin to the reactor.

The reaction product as obtained by the hydroformylation reaction may directly be used as a starting material for the subsequent reduction reaction or may be purified by distillation, extraction, or crystallization prior to being subjected to the subsequent step.

[Production of $C_{14}$ to $C_{22}$ Compound of Formula (2)]

The $C_{14}$ to $C_{22}$ compound of the formula (2) in the formula (I) can be produced by a reduction reaction of the $C_{14}$ to $C_{22}$ compound of the formula (3) in the presence of a catalyst having hydrogenation activity and hydrogen.

In the reduction reaction, a catalyst containing at least one element selected from the group consisting of copper, chromium, iron, zinc, aluminum, nickel, cobalt, and palladium is preferably used as the catalyst having hydrogenation activity. Examples of more preferred catalysts include a Cu—Cr catalyst, a Cu—Zn catalyst, and a Cu—Zn—Al catalyst and further include a Raney-Ni catalyst and a Raney-Co catalyst. A Cu—Cr catalyst and a Raney-Co catalyst are even more preferred.

The amount of the hydrogenation catalyst used is 1 to 100% by mass, preferably 2 to 50% by mass, and more preferably 5 to 30% by mass based on the $C_{14}$ to $C_{22}$ compound of the formula (3) which is a substrate.

Setting the amount of the catalyst used within these ranges enables the hydrogenation reaction to take place in a suitable manner. When the amount of the catalyst used is 1% by mass or more, the reaction tends to be achieved sufficiently to obtain a sufficient yield of the intended product. When the amount of the catalyst used is 100% by mass or less, a good balance tends to be established between the amount of the catalyst used for the reaction and the increasing effect on the reaction rate.

The reaction temperature in the reduction reaction is preferably 60 to 200° C. and more preferably 80° C. to 150° C. Setting the reaction temperature to 200° C. or lower tends to prevent the occurrence of side reaction or decomposition reaction and give the intended product in a high yield. Setting the reaction temperature to 60° C. or higher tends to allow completion of the reaction in a moderate period of time and enable avoidance of decrease in productivity or decrease in yield of the intended product.

The reaction pressure in the reduction reaction, as expressed by a hydrogen partial pressure, is preferably 0.5 to 10 MPa and more preferably 1 to 5 MPa. Setting the hydrogen partial pressure to 10 MPa or less tends to prevent the occurrence of side reaction or decomposition reaction and give the intended product in a high yield. Setting the hydrogen partial pressure to 0.5 MPa or more tends to allow completion of the reaction in a moderate period of time and enable avoidance of decrease in productivity or decrease in yield of the intended product. In the reduction reaction, an inert gas (such as nitrogen or argon) may be additionally present.

In the reduction reaction, a solvent can be used. Examples of the solvent used in the reduction reaction include aliphatic hydrocarbons, alicyclic hydrocarbons, aromatic hydrocarbons, and alcohols, among which alicyclic hydrocarbons, aromatic hydrocarbons, and alcohols are preferred. Specific examples of the solvent include cyclohexane, toluene, xylene, methanol, ethanol, and 1-propanol.

The reduction reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate or substrate solution is made to flow in a tubular reactor filled with a forming catalyst under predetermined reaction conditions.

The reaction product obtained by the reduction reaction can be purified, for example, by distillation, extraction, or crystallization.

The method used in the present embodiment to copolymerize the compound of the formula (2) or the compound of the formula (8) as a monomer corresponding to the unit (A) with other monomers corresponding to the units (B) and (C) is not particularly limited, and a conventionally known method for producing polyester can be employed. Examples of the method include: melt polymerization methods such as transesterification and direct esterification; and solution polymerization methods.

For production of the polyester resin in the present embodiment, a catalyst used for production of common polyester resins, such as a transesterification catalyst, an esterification catalyst, or a polycondensation catalyst, may be used. The catalyst is not particularly limited, and examples thereof include: compounds (e.g., fatty acid salts, carbonic acid salts, phosphoric acid salts, hydroxides, chlorides, oxides, and alkoxides) of metals such as zinc, lead, cerium, cadmium, manganese, cobalt, lithium, sodium, potassium, calcium, nickel, magnesium, vanadium, aluminum, titanium, antimony, germanium, and tin; and metallic magnesium. These may be used alone, or two or more thereof may be used in combination. Among the above examples, preferred catalysts are compounds of manganese, cobalt, zinc, titanium, calcium, antimony, germanium, and tin. Compounds of manganese, titanium, antimony, germanium, and tin are more preferred. The amount of such a catalyst used is not particularly limited. The catalyst amount on a metal component basis is preferably 1 to 1000 ppm, more preferably 3 to 750 ppm, and even more preferably 5 to 500 ppm based on the starting materials for the polyester resin.

The reaction temperature in the polymerization reaction depends on the type and amount of the catalyst used and is typically selected in the range of 150° C. to 300° C. From the viewpoint of the reaction rate and coloring of the resulting resin, the reaction temperature is preferably 180° C. to 280° C. It is preferable that the pressure inside the reaction tank be initially atmospheric pressure and finally controlled to 1 kPa or less, more preferably to 0.5 kPa or less.

For the polymerization reaction, a phosphorus compound may be added if desired. Examples of the phosphorus compound include, but are not limited to, phosphoric acid, phosphorous acid, phosphoric acid esters, and phosphorous acid esters. Examples of the phosphoric acid esters include, but are not limited to, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate, and triphenyl phosphate. Examples of the phosphorous acid esters include, but are not limited to, methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite, and triphenyl phosphite. These may be used alone, or two or more thereof may be used in combination. The concentration of phosphorus atoms in the copolymerized polyester resin in the present embodiment is preferably 1 to 500 ppm, more preferably 5 to 400 ppm, and even more preferably 10 to 200 ppm.

For production of the polyester resin in the present embodiment, an etherification inhibitor, a stabilizer such as a thermal stabilizer or light stabilizer, and a polymerization modifier can be used.

Various additives and a forming aid can be added to the copolymerized polyester resin in the present embodiment as long as the purpose of the present embodiment is not impaired, and examples of the additives include an antioxidant, a light stabilizer, an ultraviolet absorber, a plasticizer, an extender, a delustrant, a drying regulator, an anti-static agent, an anti-settling agent, a surfactant, a flow modifier, a drying oil, a wax, a filler, a colorant, a reinforcing agent, a surface smoothing agent, a leveling agent, a curing accelerator, and a thickener.

A copolymerized polyester resin composition of the present embodiment may contain a resin other than the copolymerized polyester resin in the present embodiment as long as the intended effect of the present embodiment is not impaired. The other resin which may be further contained is not particularly limited and is, for example, at least one resin selected from the group consisting of polyester resins other than the polyester resin in the present embodiment, polycarbonate resins, (meth)acrylic resins, polyamide resins, polystyrene resins, cycloolefin resins, acrylonitrile-butadiene-styrene copolymer resins, vinyl chloride resins, polyphenylene ether resins, polysulfone resins, polyacetal resins, and methyl methacrylate-styrene copolymer resins. These resins can be known resins, and one of these resins or a combination of two or more of these resins may be added to the resin composition.

[Method of Producing Base Material]

The method of producing the base material in the present embodiment is preferably a method that yields a highly uniform thickness and avoids formation of gel, fish eye, and scratch and that results in a minimal content of foreign matter. Examples of the method include known methods such as casting, melt extrusion, and calendering. The method used to stretch the film can also be a known method, and longitudinal uniaxial stretching, transverse uniaxial stretching, multi-step stretching, or simultaneous biaxial stretching may be used.

The stretching ratio in the stretching process can be arbitrarily chosen and is preferably 1.1 to 5 and more preferably 1.2 to 3. The stretching temperature is preferably in the range of Tg−30° C. to Tg+50° C. and more preferably in the range of Tg−20° C. to Tg+30° C., where Tg is the glass transition temperature.

The thickness of the base material obtained as above is not particularly limited and can be in the range of 1 to 200 μm. The thickness is preferably in the range of 10 to 150 μm and more preferably in the range of 15 to 100 μm.

[Functional Layer]

The optical polyester film of the present embodiment has at least one functional layer disposed on at least one surface of the base material, wherein the at least one functional layer is selected from the group consisting of a hard coat layer, a transparent conductive layer, an anti-reflection layer, a gas barrier layer, and an adhesive layer.

(Hard Coat Layer)

The hard coat layer in the present embodiment can be formed on a surface of the base material to improve the surface smoothness and increase the surface hardness. This hard coat layer may be laminated on a surface of the transparent conductive layer or gas barrier layer described later, rather than on a surface of the base material. The gas barrier layer and transparent conductive layer may be laminated on a surface of the hard coat layer. Between these layers there may be provided a bonding layer or primer layer.

The bonding layer or primer layer can be obtained by applying a resin varnish and drying the varnish to remove a solvent. From the viewpoint of uniform application, a varnish is preferred to which a resin having the ability to form a film after solvent removal, namely a solid resin, has been added. Specific examples of the resin for this purpose include: photocurable resins, including so-called acrylic prepolymers such as epoxy diacrylate, urethane diacrylate, and polyester diacrylate; thermosetting resins, including epoxy-based thermosetting resins such as o-cresol novolac epoxy resins and bisphenol epoxy resins, urethane-based thermosetting resins, acrylic-based thermosetting resins, urea-based thermosetting resins, melamine-based thermosetting resins, and unsaturated polyester-based thermosetting resins; and electron ray-curable resins. Among these, photocurable resins are preferred in terms of productivity and cost.

The constituent material of the hard coat layer is not particularly limited. A conventionally used composition containing an energy ray-curable resin or thermosetting resin can be used. Such a composition containing an energy ray-curable resin or thermosetting resin may consist of an organic component or may further contain inorganic particles.

Examples of the inorganic particles include, but are not limited to: silica-based particles such as colloidal silica fine particles; particles based on a carbonic acid salt such as calcium carbonate; and particles based on a metal oxide such as titanium oxide. Among these, silica-based particles are preferred in terms of ease of surface modification and availability, and colloidal silica fine particles are particularly preferred due to the ease of control of their particle size. The average particle size of the inorganic particles is preferably 400 nm or less, more preferably 100 nm or less, and even more preferably 50 nm or less.

The colloidal silica fine particles are silicic anhydride ultrafine particles having an average particle size of 1 to 400 nm and dispersed in water or an organic solvent. Such colloidal silica fine particles can be produced by a known method and are also commercially available.

In terms of dispersibility and strength, the inorganic particles are preferably surface-treated with a polymerizable unsaturated group. Examples of the polymerizable unsaturated group include a (meth)acryloyl group, a styryl group, and a vinyl group and, in particular, a (meth)acryloyl group is preferred due to its high reactivity and superiority in terms of productivity.

The method for surface treatment of the inorganic particles is not particularly limited. A preferred surface treatment method is one using an organosilane compound having a polymerizable unsaturated group. An example of such a surface treatment method is one in which the inorganic particles and the organosilane compound having a polymerizable unsaturated group are mixed, a hydrolysis catalyst is then added, and the resulting mixture is stirred at ordinary temperature or under heating. In this method, a condensation reaction is allowed to take place while a dispersing catalyst in the inorganic particles and water resulting from the condensation reaction are azeotropically distilled off at ordinary pressure or reduced pressure. In order to promote this reaction, a catalyst such as water, an acid, a base, or a salt may be used. In this manner, surface-treated inorganic particles can be obtained.

The polymerizable unsaturated group-containing organosilane compound used in the surface treatment method is not particularly limited, and examples thereof include styryltrimethoxysilane, styryltriethoxysilane, vinyltris(3-methoxyethoxy)silane, vinyltriethoxysilane, vinyltrimethoxysilane, 3-methacryloyloxypropyltrimethoxysilane, 3-acryloyloxypropyltrimethoxysilane, 3-methacryloyloxypropyltriethoxysilane, β-(3,4-epoxycyclohexyl)ethyltrimethoxysilane, 3-glycidoxypropyltrimethoxysilane, 3-glycidoxypropylmethyldiethoxysilane, 3-' methacryloyloxypropylmethyldiethoxysilane, N-β(aminoethyl)γ-aminopropyltrimethoxysilane, N-β(aminoethyl)-aminopropylmethyldimethoxysilane, 3-aminopropyltriethoxysilane, N-phenyl-γ-aminopropyltrimethoxysilane, 3-aminopropyltriethoxysilane, N-phenyl-γ-aminopropyltrimethoxysilane, and 3-isocyanatopropyltriethoxysilane.

One of these may be used, or two or more thereof may be used in combination. Silane compounds particularly preferred in terms of high reactivity include: a silane compound resulting from addition of (meth)acrylic acid to an epoxy group or glycidyl group of an organosilane compound as mentioned above; a silane compound resulting from Michael addition of a compound containing two (meth)acryloyloxy groups to an amino group of an organosilane compound as mentioned above; a silane compound resulting from addition of a compound having a (meth)acryloyloxy group and an isocyanate group to an amino group or mercapto group of an organosilane compound as mentioned above; a silane compound resulting from addition of a compound having a (meth)acryloyloxy group to an isocyanate group of an organosilane compound as mentioned above; and a silane compound selected from 3-methacryloyloxypropyltrimethoxysilane, 3-acryloyloxypropyltrimethoxysilane, 3-methacryloyloxypropyltriethoxysilane, 3-acryloyloxypropyltriethoxysilane, vinyltrimethoxysilane, and vinyltriethoxysilane.

Examples of the organic component include, but are not limited to, organic compounds having a polymerizable group. Examples of the organic compounds having a polymerizable group include: organic compounds having a radically-polymerizable group, such as organic compounds having a (meth)acryloyl group, organic compounds having a styryl group, and organic compounds having a vinyl group; and organic compounds having an ionically-polymerizable group, such as organic compounds having an epoxy group and organic compounds having an oxetanyl group. Among these, organic compounds having a radically-polymerizable group are preferred in terms of thermal stability of the resulting cured product and, in particular, organic compounds having a (meth)acryloyl group are preferred in terms of productivity. Examples of the organic compounds include urethane, epoxy, polyester, and (meth)acrylate.

Specific examples of the organic compounds having a (meth)acryloyl group include, but are not limited to, monofunctional or multi-functional (meth)acrylic acid esters such as urethane (meth)acrylate, epoxy (meth)acrylate, polyester (meth)acrylate, mono(meth)acrylate, di(meth)acrylate, mono(meth)acrylamide, and di(meth)acrylamide.

The hard coat layer can be produced by exposing a composition containing an energy ray-curable resin or thermosetting resin to active energy rays and/or by heating the composition to cure the composition through radical polymerization and/or ion polymerization.

When the curing is achieved through radical polymerization, it is preferable to use a polymerization initiator. Examples of the polymerization initiator include photopolymerization initiators such as: benzophenones such as benzophenone, 4,4-bis(diethylamino)benzophenone, 2,4,6-trimethylbenzophenone, methyl o-benzoylbenzoate, and 4-phenylbenzophenone; thioxanthones such as thioxanthone, diethylthioxanthone, isopropylthioxanthone, and chlorothioxanthone; anthraquinones such as t-butylanthraquinone and 2-ethylanthraquinone; 2-methyl-1-[4-(methylthio)phenyl]-2-morpholinopropan-1-one; methyl benzoylformate; and 1-hydroxycyclohexyl phenyl ketone. Examples of the polymerization initiator further include thermal polymerization initiators such as methyl ethyl ketone peroxide, benzoyl peroxide, dicumyl peroxide, t-butyl hydroperoxide, cumene hydroperoxide, t-butyl peroxyoctoate, t-butyl peroxybenzoate, and lauroyl peroxide. These polymerization initiators may be used alone or may be used as a mixture. The polymerization initiator used is selected in view of production process-related factors such as productivity and storage stability and quality-related factors such as coloring. In particular, a photopolymerization initiator is preferably used due to its superiority in terms of productivity.

When the curing is achieved through ion polymerization, it is preferable to use a polymerization initiator, and examples of the polymerization initiator include aromatic diazonium salts, aromatic sulfonium salts, aromatic iodonium salts, metallocene compounds, and benzoinsulfonic acid esters. These may be used alone or may be used as a mixture.

In order to modify the physical properties such as the flexibility and surface hardness of the hard coat layer, a resin that is not cured upon exposure to energy rays can be added. Specific examples of such a resin include polyurethane resins, cellulose resins, polyvinyl butyral resins, polyester resins, acrylic resins, polyvinyl chloride resins, and thermoplastic resins such as polyvinyl acetate. In particular, the addition of a polyurethane resin, cellulose resin, or polyvinyl butyral resin is preferred for improvement in flexibility.

Examples of the active energy rays include known active energy rays such as electron rays, ultraviolet rays, infrared rays, and visible rays. Among these rays, ultraviolet rays are preferably used due to the high utility and superiority in terms of device cost and productivity. A suitable light source for emission of ultraviolet rays is, for example, an ultra-high pressure mercury lamp, a high pressure mercury lamp, a medium pressure mercury lamp, a low pressure mercury lamp, a metal halide lamp, a high-frequency induction mercury lamp, or a UV-LED.

The atmosphere during the curing by exposure to active energy rays may be an atmosphere of an inert gas such as nitrogen or argon or may be an air atmosphere. Of these atmospheres, an air atmosphere is desired in terms of simplicity and low cost.

The curing conditions are not particularly limited. For example, when active energy rays are used, the dose is preferably in the range of 0.01 to 10 J/cm$^2$, more preferably in the range of 0.05 to 5 J/cm$^2$, and particularly preferably in the range of 0.1 to 3 J/cm$^2$. When the curing is carried out by heating, heating at a temperature of 30 to 200° C. for 1 to 180 minutes is preferred, heating at a temperature of 50 to 180° C. for 2 to 120 minutes is more preferred, and heating at a temperature of 80 to 150° C. for 5 to 60 minutes is even more preferred.

A commercially-available hard coat agent may be used for the hard coat layer in the present embodiment. Examples of commercially-available hard coat agents containing inorganic particles include: DeSolite (registered trademark), a hard coat agent available from JSR Corporation; RAYQUEEN (registered trademark), a hard coat agent available from Mitsubishi Rayon Co., Ltd.; BEAMSET (registered trademark), a hard coat agent available from Arakawa Chemical Industries, Ltd.; and ADEKA Nanohybrid Silicone FX-V, a hard coat agent available from ADEKA Corporation.

In the present embodiment, such a hard coat agent is dissolved, for example, in an organic solvent, and the viscosity of the resulting solution is adjusted to prepare a coating liquid, which is applied and dried on a base film containing the polyester resin of the present embodiment. The dried product is then cured by exposure to active energy rays and/or heating to form the hard coat layer.

The organic solvent used in the coating liquid for hard coat layer formation can be selected as appropriate from aliphatic hydrocarbons such as hexane and octane, alcohols such as ethanol, 1-propanol, isopropanol, and 1-butanol, ethyl acetate, and methyl ethyl ketone. Two or more of these organic solvents may be used as a mixture if necessary. The organic solvent used needs to be evaporated after the application of the coating liquid, and it is therefore desirable for the organic solvent to have a boiling point of 70 to 200° C.

In order to achieve suitable application of the coating liquid for hard coat layer formation, a leveling additive may be added which acts on the surface of the film of the applied liquid to reduce the surface tension. Examples of the additive include fluorine-based additives, siloxane-based additives, acrylic-based additives, and acetylene glycol-based additives.

For the leveling, a commercially-available additive may be used. Examples of commercially-available fluorine-based additives include Fluorad (registered trademark) FC-430 and Fluorad FC-170 available from Sumitomo 3M Ltd.; and MEGAFAC (registered trademark) F177 and MEGAFAC F471 available from DIC Corporation. Examples of siloxane-based additives include BYK-300 (registered trademark) and BYK-077 (registered trademark) available from BYK Japan K.K. Examples of acrylic-based additives include: BYK-380 (registered trademark) available from BYK Japan K.K.; and DISPARON (registered trademark) L-1984-50 and DISPARON L-1970 available from Kusumoto Chemicals, Ltd. Examples of acetylene glycol-based additives include SURFYNOL (registered trademark) 61 and SURFYNOL 485 available from Shin-Etsu Chemical Co., Ltd. These additives may be used alone or used as a mixture.

The surface hardness of the hard coat layer is not particularly limited. Preferably, the surface hardness is rated as "H" or higher when measured by a pensile hardness test according to JIS K 5400.

The thickness of the hard coat layer is not particularly limited. From the viewpoint of hardness, flexibility, and production efficiency, the thickness is preferably 0.5 to 30 μm and more preferably 3 to 15 μm.

The surface roughness of the surface to be provided with the hard coat is preferably 0.5 μm or less. When the surface roughness is 0.5 μm or less, another layer laminated on the hard coat layer is more easily made smooth, with the result that the laminated layer has an enhanced strength and can be prevented from being separated during long-term use. The surface roughness can be measured using a commercially-available surface-profile microscope.

(Transparent Conductive Layer)

The transparent conductive layer in the present embodiment is a layer containing a material having both transparency and electrical conductivity. The transparency of the transparent conductive layer can be evaluated by total light transmittance, and the total light transmittance is preferably 80% or more and more preferably 82% or more. The specific resistance is typically about 1 to $8 \times 10^{-4}$ Ω·cm. By varying the thickness of a conductive film to be laminated, the resistance can be adjusted to obtain a surface resistance (Ω/□) appropriate for the intended use. However, a kind of conductive film such as an ITO film has absorption in the short-wavelength visible region, and an extreme increase in thickness of such a film tends to cause a change in color and a decrease in light transmittance. It is preferable to consider such a balance in adjusting the thickness of the transparent conductive layer. The thickness of the transparent conductive layer can be selected as appropriate, for example, within the range of 50 to 4,000 Å.

When the functional layer in the present embodiment includes a transparent conductive layer, the optical polyester film is particularly referred to as a "transparent conductive film". That is, a transparent conductive film of the present embodiment is a film which has the optical polyester film of the present embodiment and in which the functional layer includes a transparent conductive layer.

Specific examples of the constituent component of the transparent conductive layer in the present embodiment include, but are not limited to: inorganic substances such as inorganic oxides, inorganic nitrides, and inorganic sulfides (e.g., indium tin oxide (ITO), aluminum oxide, silicon oxide, titanium oxide, zinc oxide, tungsten oxide, aluminum nitride, silicon nitride, titanium nitride, cadmium sulfide, zinc sulfide, and zinc selenide); metal nanowires, metal meshes, or metal particles containing a metal such as copper, gold, silver, or platinum or containing an alloy containing such metals; graphene; and carbon nanotubes. A conductive polymer based on polythiophene, polyaniline, or polyacetylene may also be used.

The transparent conductive layer in the present embodiment can be formed and produced on a base film by a known film formation technique such as vapor deposition, sputtering, PECVD, Cat-CVD, coating, or laminating.

(Gas Barrier Layer)

Examples of the gas barrier layer in the present embodiment include, but are not limited to, inorganic films and organic films. Examples of the inorganic films include: a film containing a metal oxide such as silicon oxide, aluminum oxide, tantalum oxide, or indium oxide; a film containing a metal nitride such as silicon nitride, aluminum nitride, or tantalum nitride; a film containing a metal oxynitride such as silicon oxynitride, aluminum oxynitride, or tantalum oxynitride; and an aluminum film. Examples of the organic films include a film of polyvinyl alcohol, a film of ethylene-vinyl alcohol copolymer, and a film of polyamide.

The gas barrier layer preferably has a thickness of 100 to 2,000 Å when containing an inorganic material, and the gas barrier layer preferably has a thickness of 500 to 10,000 Å when containing an organic material.

Such an inorganic material can be formed into a film by a known technique such as sputtering, ion plating, resistive heating, or CVD. When an organic material is used, the organic material may be dissolved in a solvent, and the resulting solution may be applied by a coating technique as described above and dried to form a film.

A bonding layer or primer layer may be provided between the base material and the gas barrier layer.

A protective coat layer may be laminated on the gas barrier layer to protect the gas barrier layer. The protective coat layer is preferably formed by the same method as the bonding layer or primer layer. In order to improve the gas barrier properties, an inorganic layer may be further laminated on the protective coat layer. The protective coat layer more preferably contains a material having superior gas barrier properties. Even more preferably, the protective coat layer has an oxygen transmission rate as measured at 23° C. of 0.1 cc·mm/m²·day·atm or less or has a water vapor transmission rate as measured at 40° C. and 90% RH of 1 g·mm/m²·day or less.

(Anti-Reflection Layer)

The anti-reflection layer in the present embodiment may be formed on the base material or between other layers or may be an outermost layer. The anti-reflection layer may be laminated on either or both of the surfaces of the base material. In the present embodiment, a low-refractive-index layer may be provided, or high-refractive-index layers and low-refractive-index layers may be alternately laminated.

A high-refractive-index layer refers to a layer having a refractive index of 1.80 or more, and a low-refractive-index layer refers to a layer having a refractive index of 1.70 or less.

The constituent material of the high-refractive-index layer is, for example, at least one selected from titanium oxide, zirconium oxide, tantalum oxide, zinc oxide, niobium oxide, hafnium oxide, cerium oxide, indium oxide, tin oxide, and indium tin oxide or a mixture of two or more of these oxides.

The constituent material of the low-refractive-index layer is, for example, silicon oxide, magnesium fluoride, or calcium fluoride.

The anti-reflection layer can be formed by any method such as vacuum deposition, sputtering, ion plating, or ion beam-assisted deposition.

The thickness of the anti-reflection layer is preferably 10 to 500 nm and more preferably 50 to 500 nm.

It is preferable that there be two or more high-refractive-index layers and two or more low-refractive-index layers. When the respective numbers of the high-refractive-index layers and the low-refractive-index layers are two or more, the reflectance in the visible region can be reduced over a wide wavelength range. The thicknesses of the high-refractive-index layer and the low-refractive-index layer may be adjusted as appropriate so that the thickness of the anti-reflection layer will be in the range described above and that a desired reflectance will be achieved.

In the present embodiment, the reflectance for light at a wavelength of 550 nm is typically 1% or less, preferably 0.5% or less, and more preferably 0.3% or less. The reflectance can be measured using a common spectrophotometer.

(Adhesive Layer)

The adhesive layer in the present embodiment is intended to improve bonding property between the base material and the other layers. The adhesive layer can be formed by dissolving an adhesive in a solvent, applying the resulting solution by a coating technique, and drying the applied solution.

The adhesive is preferably an adhesive that has high transparency, that has low birefringence, and that exhibits a sufficient adhesive strength even when used in the form of a thin layer. Examples of such an adhesive include: resin-based adhesives such as those based on natural rubber, synthetic rubber or elastomer, vinyl chloride/vinyl acetate copolymer, polyvinyl alkyl ether, polyacrylate, or modified polyolefin; and curable adhesives resulting from the addition of a curing agent such as an isocyanate to these resin-based adhesives. In particular, curable adhesives selected from among adhesives used in bonding agents for polyolefin foams or polyester films are preferred. It is also possible to use a dry lamination bonding agent which is a mixture of a polyurethane-based resin solution and a polyisocyanate resin solution, a styrene-butadiene rubber-based bonding agent, or a two-component curable epoxy-based bonding agent such as a two-component bonding agent consisting of an epoxy resin and polythiol or a two-component bonding agent consisting of an epoxy resin and polyamide. In particular, a solution-type bonding agent and a two-component curable epoxy-based bonding agent are preferred, and these bonding agents are preferably transparent. Some bonding agents can exhibit enhanced bond strength with the aid of an appropriate bonding primer. When such a bonding agent is used, it is preferable to use a bonding primer.

The optical polyester film of the present embodiment may include, in addition to the functional layer as described above, a layer (occasionally referred to as "additional layer" hereinafter) having at least one ability selected from the group consisting of self-restoring ability, anti-glare ability, and anti-static ability. Such an additional layer may be laminated directly on the base material or may be laminated on a surface of the functional layer remote from the base material. Various layers other than the above layers may be formed, and examples of the various layers include, but are not limited to, a light diffusion layer, a prism lens layer, an infrared absorption layer, and an electromagnetic wave absorption layer.

The self-restoring ability is the ability to resist damage by repairing damage through elastic recovery. This ability is such that when a surface is rubbed with a brass brush under a load of 500 g, the damage is repaired preferably within 3 minutes, more preferably within 1 minute.

The anti-glare ability is the ability to improve visibility by reducing reflected glare of external light through surficial light scattering. This ability is such that a haze as evaluated according to JIS K 7136 (2000) is preferably 2 to 50%, more preferably 2 to 40%, and particularly preferably 2 to 30%.

The anti-static ability is the ability to leak and remove triboelectricity generated by separation from a surface or rubbing of a surface. An index of this ability is a surface resistivity as specified in JIS K 6911 (2006), and this surface resistivity is preferably $10^{11}\Omega/\square$ or less and more preferably $10^{9}\Omega/\square$ or less. The provision of the anti-static ability can be achieved by a layer containing a known anti-static agent, and may be achieved by a layer containing a conductive polymer such as polythiophene, polypyrrole, or polyaniline.

The thickness of the additional layer depends on its function, and is preferably in the range of 10 nm to 30 µm and more preferably in the range of 50 nm to 20 µm. When the thickness of the additional layer is within this range, sufficient optical performance tends to be obtained while the function provided by the functional layer is sufficiently achieved.

EXAMPLES

Hereinafter, the present invention will be described in more detail with examples. The scope of the present invention is not limited by the examples.

(1) Composition of Resin

The proportions of the diol structural unit and dicarboxylic acid structural unit in the polyester resin were calculated by 1H-NMR measurement. The measurement apparatus used was a nuclear magnetic resonance apparatus (available from JEOL Ltd., product name: JNM-AL400), and the measurement was conducted at 400 MHz. The solvent used was deuterated chloroform.

(2) Glass Transition Temperature (Tg)

The glass transition temperature of the polyester resin was measured as follows. A differential scanning calorimeter (available from Shimadzu Corporation, product name: DSC/TA-60WS) was used, and a measurement sample was prepared by placing about 10 mg of the polyester resin in an unsealed aluminum vessel, melting the polyester resin by heating to 280° C. at a temperature rise rate of 20° C./min under a stream of nitrogen gas (50 mL/min), and rapidly cooling the molten resin. This sample was subjected to measurement under the same conditions, and the glass transition temperature was determined as a temperature at which, in the DSC curve, the change reached ½ of the difference in the baseline before and after transition.

(3) Amount of Heat Generated at Cooling Crystallization (ΔHc)

The amount of heat generated by the polyester resin at cooling crystallization was calculated from the area of an exothermic peak that appeared during temperature decrease at a temperature decrease rate of 5° C./rain after holding at 280° C. for 1 minute following the measurement of Tg.

(4) Pencil Hardness

In accordance with JIS K 5600-5-4, different pencils were pressed, in order of increasing hardness, against the surface provided with a hard coat at an angle of 45 degrees under a load of 750 g, and the hardness of the hardest pencil among those which caused no scar was determined as the pencil hardness.

(5) Total Light Transmittance

To evaluate the transparency of the polyester resin (base material), the polyester resin was press-formed to give a sample in the shape of a circular sheet (thickness: 3 mm), and the total light transmittance of this sample was measured. For this measurement, a color difference/turbidity meter (available from Nippon Denshoku Industries Co., Ltd., product name: COH-400) was used.

(6) Photoelastic Coefficient ($Pa^{-1}$)

A 1 cm×5 cm test piece was cut out from a 100-µm-thick optical film as described below, and this test piece was used as a measurement sample. An ellipsometer (available from JASCO Corporation, product name: M220) was used to measure birefringence at a wavelength of 633 nm with respect to the change in load, and the photoelastic coefficient was calculated from the measurement result.

(7) Adhesion

The following procedures were performed in accordance with JIS K 5400: A grid pattern consisting of 25 cells was formed in the sample (optical polyester film) by making six slits at an interval of 2 mm in each of the two orthogonal directions using a razor; a commercially-available Cellophane (registered trademark) tape was firmly attached to the sample and then rapidly peeled by pulling it in a 90° direction; and the number of the cells from which the coating was separated was counted. This test was conducted for both the hard coat layer side and the ITO layer side. The rating "A" was given when the counted number was zero, the rating "B" was given when the counted number was 1 to 5, and the rating "C" was given when the counted number was 6 or more.

(8) Birefringence

A test piece (optical polyester film) was set in a cross-Nicol arrangement and placed in a light box with a color temperature of 5000 K, and whether light leakage occurs was examined by visual inspection. The rating "o" was given when no light leakage was observed, and the rating "x" was given when light leakage was observed.

Monomer Synthesis Example

A 500 mL stainless steel reaction vessel was charged with 173 g (2.01 mol) of methyl acrylate and 167 g (1.26 mol) of dicyclopentadiene, which were reacted at 195° C. for 2 hours. The reaction gave a reaction liquid containing 96 g of the monoolefin of the following formula (4a). This liquid was subjected to purification by distillation, and a portion of the purified product was used for the subsequent reaction.

A 300 mL stainless steel reaction vessel was used to allow the distillation-purified monoolefin of the formula (4a) to undergo hydroformylation reaction using a $CO/H_2$ mixed gas ($CO/H_2$ molar ratio=1). Specifically, the reaction vessel was charged with 70 g of the monoolefin of the formula (4a), 140 g of toluene, 0.50 g of triphenyl phosphite, and 550 μL of a separately prepared toluene solution of Rh(acac) $(CO)_2$ (concentration: 0.003 mol/L). After three cycles of purging with nitrogen and three cycles of purging with the $CO/H_2$ mixed gas, the inside of the system was pressurized with the $CO/H_2$ mixed gas, and the reaction was allowed to proceed at 100° C. and 2 MPa for 5 hours. After completion of the reaction, the reaction liquid was analyzed by gas chromatography to confirm that this reaction liquid contained 76 g of the compound of the formula (3a) and 1.4 g of the monoolefin of the formula (4a) (conversion: 98%, selectivity: 97%). The reaction liquid was subjected to purification by distillation, and a portion of the purified product was used for the subsequent reaction.

A 300 mL stainless steel reaction vessel was charged with 54 g of the distillation-purified compound of the formula (3a), 7 mL of a sponge cobalt catalyst (R-400, available from Nikko Rica Corporation), and 109 g of toluene, then the inside of the system was pressurized with hydrogen gas, and the reaction was allowed to proceed at 3 MPa and 100° C. for 9 hours. After the reaction, the resulting slurry was filtered through a membrane filter having a pore size of 0.2 μm to remove the catalyst. After that, the solvent was distilled off using an evaporator, and the resulting product was analyzed by gas chromatography and GC-MS to confirm that the product contained 51 g of the main reaction product of the formula (2a) which had a molecular weight of 250 (main reaction product yield: 93%). Purification by distillation was further conducted to obtain the main reaction product.

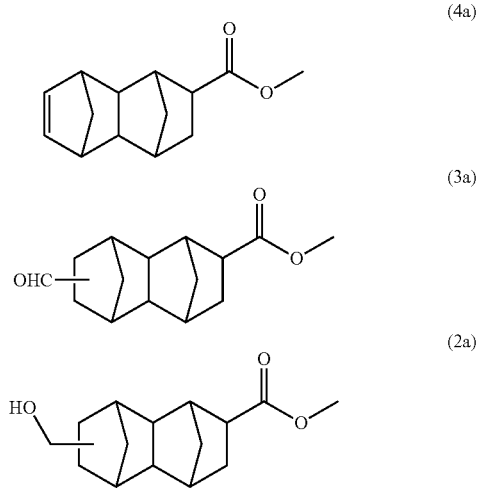

<Identification of Reaction Product>

Figure 2:
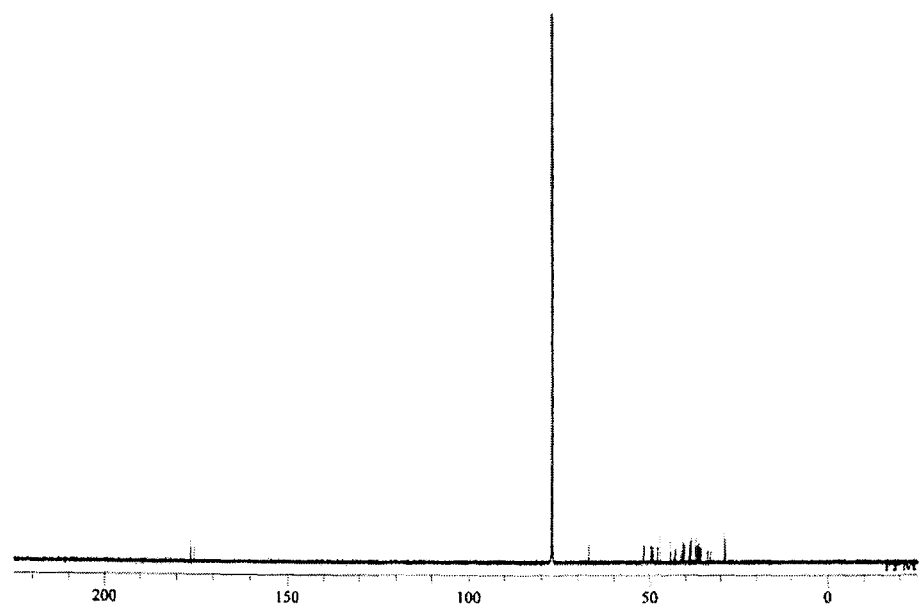
FIG. 2 shows a result of $^{13}$C-NMR measurement of the main reaction product obtained in the monomer synthesis example.
Figure 3:
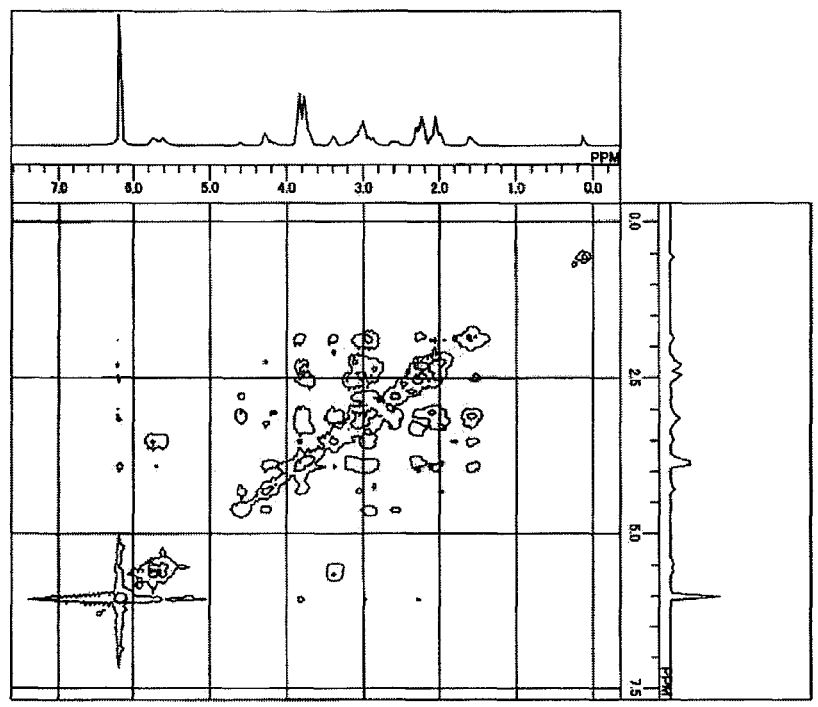
FIG. 3 shows a result of COSY-NMR measurement of the main reaction product obtained in the monomer synthesis example.

The components obtained in the monomer synthesis example were analyzed by NMR. The NMR spectra are shown in FIGS. 1 to 3. The result of GC-MS analysis specified below and the NMR analysis results shown in FIGS. 1 to 3 confirmed that the main reaction product obtained in the monomer synthesis example was the compound of the formula (2a).

<Analysis Method>

1) Conditions of Gas Chromatography Measurement
   Analyzer: Capillary gas chromatograph GC-2010 Plus, available from Shimadzu Corporation
   Analysis column: InertCapl (30 m, 0.32 mm I.D., thickness: 0.25 μm), available from GL Sciences Inc. Oven temperature: 60° C. (0.5 minutes)–15° C./min-280° C. (4 minutes)
   Detector: FID, temperature: 280° C.

2) Conditions of GC-MS Measurement
   Analyzer: GCMS-QP2010 Plus, available from Shimadzu Corporation
   Ionization voltage: 70 eV
   Analysis column: DB-1 (30 m, 0.32 mm I.D., thickness: 1.00 μm), available from Agilent Technologies
   Oven temperature: 60° C. (0.5 minutes)–15° C./min-280° C. (4 minutes)

3) Conditions of NMR Measurement
   Apparatus: JNM-ECA500 (500 MHz), available from JEOL Ltd.
   Measurement mode: 1H-NMR, 13C-NMR, and COSY-NMR
   Solvent: $CDCl_3$ (deuterated chloroform)
   Internal standard: Tetramethylsilane Example 1

A 200 mL polyester production apparatus equipped with a partial condenser, a total condenser, a cold trap, a stirrer, a heater, and a nitrogen inlet tube was charged with 91.7 g of the compound of the formula (2a) obtained in the monomer synthesis example and 0.04 g of tetrabutyl titanate. The temperature was raised to 230° C. under a nitrogen atmosphere and maintained at 230° C. for 1 hour to distil off a certain amount of methanol. After that, 0.003 g of phosphoric acid was added, the temperature was gradually raised in conjunction with gradual pressure reduction, and finally polycondensation was allowed to proceed at 270° C. and at 0.1 kPa or a lower pressure. Once an appropriate melt viscosity was reached, the reaction was terminated, and thus a polyester resin was obtained.

An optical film to be measured for the photoelastic coefficient was produced by a casting method. Specifically, the obtained polyester resin was dissolved in dichloromethane to a concentration of 5 wt %, and the resulting solution was cast onto a casting plate which was confirmed to be horizontally positioned and, after that, the solvent was evaporated from the cast solution along with adjustment of the amount of evaporation. Thus, a 100-μm-thick transparent optical film was obtained. The obtained optical film was thoroughly dried using a dryer at a temperature equal to or lower than the glass transition temperature, and then a 5 cm×1 cm sample was cut out from the film. The photoelastic coefficient of this sample was evaluated using an ellipsometer. The results of the various evaluations are shown in Table 1.

A hard coat layer was formed as follows. The 100-μm-thick optical film as obtained above was used as a base material, and a hard coat solution prepared by mixing 100 parts by mass of UV-7600B (urethane acrylate, available from The Nippon Synthetic Chemical Industry Co., Ltd.), 100 parts by mass of ethyl acetate, and 4 parts by mass of a photopolymerization initiator (Irgacure 2959, available from BASF) was applied to the base material using a bar coater No. 24. The applied solution was dried at 90° C. for 3 minutes, after which the dried product was cured using a conveyer-type ultraviolet irradiator, U-0303 (available from GS Yuasa Corporation, employing a high pressure mercury lamp, lamp output power: 80 W/cm, conveyer speed: 3 m/min) which was set to obtain an ultraviolet dose of 540 $mJ/cm^2$. The thickness of the resulting coat layer was 12 μm. The hard coat film thus produced was subjected to evaluation of the pencil hardness and adhesion. The results are shown in Table 1. Further, a transparent conductive thin film was formed as follows. The resin surface unprovided with the hard coat was subjected to sputtering using a target consisting of 95% by mass of indium oxide and 5% by mass of tin oxide under a 0.4-Pa atmosphere consisting of 98% of argon gas and 2% of oxygen gas, and thus a 25-nm-thick ITO layer (conductive thin film) was formed. The adhesion and birefringence of the ITO layer were evaluated.

In Examples 2 and 3, optical polyester films having a base material, a hard coat layer, and an ITO layer were produced and evaluated in the same manner as in Example 1, except that the starting material proportions were changed as indicated in Table 1. The results are shown in Table 1.

Comparative Example 1

A film having a base material, a hard coat layer, and an ITO layer was produced and evaluated for the various properties in the same manner as in Example 1, except for using a 100-μm-thick oriented polyester film (E5000, available from Toyobo Co., Ltd.). The results are shown in Table 1.

Comparative Example 2

An optical film was produced as a base material by the same casting method as in Example 1, except for using a cycloolefin polymer (F52R, available from Zeon Corporation). Further, a film having the base material on which a hard coat layer and an ITO layer were provided was produced and evaluated for the various properties in the same manner as in Example 1. The results are shown in Table 1.

filed on Sep. 28, 2016, and the contents of the Japanese patent application are incorporated herein by reference.

INDUSTRIAL APPLICABILITY

The optical polyester film of the present invention is superior in transparency, heat resistance, optical properties, and adhesion, and can be suitably used, in particular, for applications requiring these physical properties.

The applications of the optical film of the present invention are not particularly limited and may be any applications for which the feature of the optical film is beneficial. The optical film can be suitably used in flat panel displays and transparent conductive films and also in optical devices such as a viewing angle-widening film, a liquid crystal display device, an organic or inorganic electroluminescent element, a plasma display, a CRT, a liquid crystal projector, an optical filter, an optical pickup system for an optical recording/reproduction apparatus, a touch panel, and an anti-reflection film.

That is, the present invention is of great industrial significance.

The invention claimed is:

1. An optical polyester film comprising:
   a base material comprising a polyester resin comprising a structural unit (A) of the following formula (1) wherein the content of the structural unit (A) based on the total structural units of the polyester resin is 76 mol % or greater; and
   at least one functional layer disposed on at least one surface of the base material, wherein the at least one functional layer is selected from the group consisting of a hard coat layer, a transparent conductive layer, an anti-reflection layer, a gas barrier layer, and an adhesive layer:

TABLE 1

|  |  |  | Example 1 | Example 2 | Example 3 | Comparative Example 1 | Comparative Example 2 |
|---|---|---|---|---|---|---|---|
| Synthesis of polyester resins |  |  |  |  |  |  |  |
| Amounts of monomers used ($\times 10^{-3}$ mol) | Hydroxycarboxylic acid | D-NHEs | 91.7 | 85.6 | 76.3 | — | — |
|  | Dicarboxylic acid/ester | DMCD | 0 | 3.8 | 9.6 |  |  |
|  |  | DMT | 0 | 0 | 0 |  |  |
|  | Diol | CHDM | 0 | 2.9 | 7.1 |  |  |
|  |  | EG | 0 | 0 | 0 |  |  |
| Evaluation results of polyester resins |  |  |  |  |  |  |  |
| Composition of copolymer (mol %) | Hydroxycarboxylic acid unit | D-NHEs | 100 | 90 | 76 | — | — |
|  | Dicarboxylic acid unit | DMCD | 0 | 5 | 12 | — |  |
|  |  | DMT | 0 | 0 | 0 | 50 |  |
|  | Diol unit | CHDM | 0 | 5 | 12 | — |  |
|  |  | EG | 0 | 0 | 0 | 50 |  |
| Glass transition temperature (Tg) (° C.) |  |  | 175 | 162 | 150 | 81 | 156 |
| Amount of heat generated at cooling crystallization (ΔHc) (J/g) |  |  | ND | ND | ND | 20 | ND |
| Photoelastic coefficient ($\times 10^{-12}$ Pa$^{-1}$) |  |  | −0.4 | 2.6 | 5 | 88 | 6 |
| Total light transmittance (%) |  |  | 91 | 91 | 91 | 90 | 92 |
| Pencil hardness |  |  | 4H | 4H | 3H | 4H | H |
| Adhesion of hard coat layer |  |  | A | A | A | B | C |
| Adhesion of ITO layer |  |  | A | A | A | A | B |
| Birefringence |  |  | ○ | ○ | ○ | × | ○ |

The abbreviations in the table are defined as follows.
D-NHEs: Decahydro-1,4:5,8-dimethanonaphthalene-2-methoxycarbonyl-6(7)-methanol
DMCD: Dimethyl 1,4-cyclohexanedicarboxylate (cis/trans=7/3)
DMT: Dimethyl terephthalate
CHDM: 1,4-cyclohexanedimethanol (cis/trans=3/7)
EG: Ethylene glycol
The present application is based on the Japanese patent application (Japanese Patent Application No. 2016-190229)

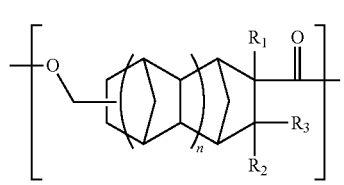 (1)

wherein
R$_1$ is a hydrogen atom, CH$_3$, or C$_2$H$_5$,
R$_2$ and R$_3$ is each independently a hydrogen atom or CH$_3$, and
n is 1.

2. The optical polyester film according to claim 1, wherein, in the formula (1), R$_1$, R$_2$, and R$_3$ are hydrogen atoms.

3. The optical polyester film according to claim 1, wherein the polyester resin satisfies the following conditions (1) to (3): (1) a glass transition temperature of the polyester resin is 100° C. or higher; (2) an amount of heat generated by the polyester resin at cooling crystallisation is 5 J/g or less; and (3) an absolute value of photoelastic coefficient of the polyester resin is $40 \times 10^{-12}$ Pa$^{-1}$ or less.

4. A transparent conductive film comprising the optical polyester film according to claim 1, wherein the functional layer comprises a transparent conductive layer.

\* \* \* \* \*